W. A. DOBLE.
GEAR PUMP.
APPLICATION FILED MAY 10, 1918.

1,359,235. Patented Nov. 16, 1920.

WITNESS

INVENTOR.
W. A. DOBLE
BY White & Prost
his ATTORNEYS

UNITED STATES PATENT OFFICE.

WILLIAM A. DOBLE, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

GEAR-PUMP.

1,359,235.  Specification of Letters Patent.  Patented Nov. 16, 1920.

Application filed May 10, 1918. Serial No. 233,718.

*To all whom it may concern:*

Be it known that I, WILLIAM A. DOBLE, a citizen of the United States, and a resident of the city and county of San Francisco and State of California, have invented a new and useful Gear-Pump, of which the following is a specification.

My invention relates to gear pump.

An object of my invention is to provide a gear pump for forcing lubricating fluid into and through the bearings of shafts having more or less axial movement.

Another object of my invention is to provide a gear pump the driving gear of which can be mounted directly upon a shaft having axial movement.

Another object of my invention is to provide a gear pump for use with the system of vertical transmission shaft construction, which is the subject of my copending application Serial Number 141,399.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Figure 1:
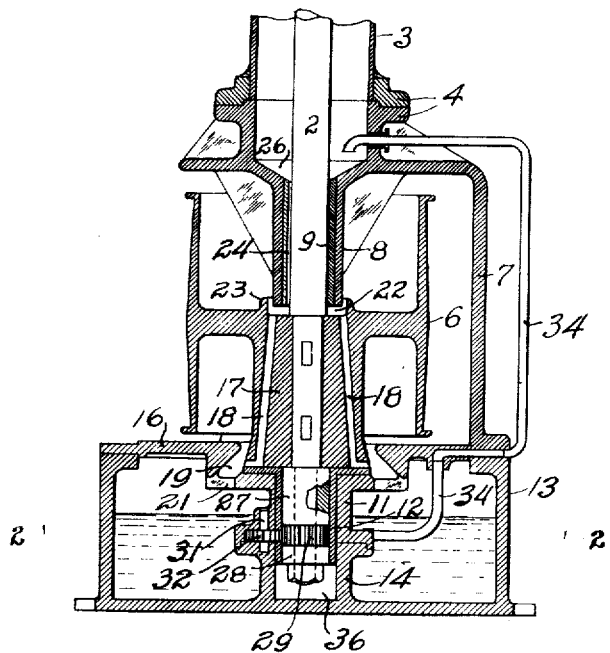
Figure 1 is a vertical section of a portion of a vertical transmission shaft showing the application of my gear pump thereto.

The shaft 2 is inclosed in the housing 3 formed of tubular elements having flanged ends 4, which are accurately finished so that a correct alinement of the housing is insured when the elements are assembled. Secured to the shaft at its lower end is a pulley 6 which may be driven from any suitable source of power in order to rotate the shaft. The pulley is partially surrounded by the housing 7 which supports the tubular elements 3 and is formed integral with the lower one. In the upper part of the housing 7 is arranged the journal bearing 8, lined with the bushing 9. In the lower part of the housing 7 is arranged the journal and step bearing 11, lined by the flanged bushing 12. A housing 13 supports the housing 7 and an annular wall 14 on the bottom of the housing 13 forms a continuation of, and support for, the journal and step bearing 11; the bushing 12 extending downwardly within the wall 14. The bottom plate 16 of the housing 7 and the contiguous wall of the housing 13; and also the contiguous faces of the bearing 11 and wall 14 are suitably finished to secure proper alinement when the two housings 7 and 13 are assembled.

The hub 17 of the pulley 6 forms a shoulder or step bearing upon the upper face of the bearing 11, and sufficient space is left between the upper end of the hub 17 and the lower face of the bearing 8 to permit a small axial movement of the shaft 2. The hub is provided with passages 18 opening at the lower end of the hub upon the step bearing and into the chamber 19 formed in the plate 16, which is in communication with the inside of the housing 13 through passages 21. The passages 18 at their upper end open into a recess or cup 22 formed in the top of the hub by an annular flange 23, which surrounds the lower end of the bearing 8. The bushing 9 is also provided with a passage 24 formed by a groove on its inner surface, which connects the cup 22 with the cup 26 formed about the top of the bearing 8.

Figure 2:
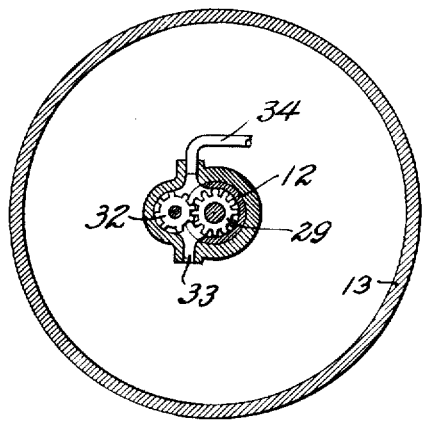
Fig. 2 is a cross section taken on the line 2—2 of Fig. 1.

The housing 13 forms an oil reservoir, and a gear pump of novel construction, to permit axial movement of the shaft 2, is arranged upon the lower end of the shaft, to pump oil from the housing 13 into the cup 26, from which the surplus oil drains through the passage 24 into the cup 22, and thence through passages 18 to the step bearing and chamber 19, and back into the housing through passages 21. A continuous bath of oil is thus supplied to the bearings. Secured to the shaft 2 and arranged in the bearing 11 is the driving gear of the pump formed conveniently in three sections. The upper and lower sections 27 and 28 are smooth surfaced and form bushings between the shaft 2 and the bushing 12, forming a running fit with the latter. The central section 29 is toothed and of the same outside diameter as the bushing sections of the gear so that it too forms a running fit with the bearing. Rotatably mounted on the pin 31 set in the wall of the bearing 11 and in the wall 14, is the driven gear 32 of the gear pump, which is in mesh with gear 29. The gear 32 is of less width than the gear 29, so that the gear 29 may move axially a limited distance while in mesh with the gear 32, without affecting the efficiency of the pump during such axial movement. As best shown in Fig. 2 the bushing 12 is cut away to permit the gear 32 to extend therethrough into mesh with the gear 29, and to connect the two recesses in which the gears are, into one gear chamber. On one side, this chamber is connected by the passage 33 with the inside of the housing 13 below the level of the oil therein, and the other side of the gear chamber is connected to the pipe 34. The other end of the pipe is passed through the tubular element 3 and terminates above the cup 26 into which the oil from the pump discharges.

The two bushing sections 27 and 28 of the driving gear prevent any material leakage of oil out of the gear chamber, but in operation sufficient oil is forced upwardly between the section 27 and the flanged bushing 12 to thoroughly lubricate the parts, and downwardly past the lower section 28 and into the closed chamber 36 under the end of the shaft to produce an end thrust upon the shaft which aids in balancing the shaft and causing it to virtually float on oil.

It will be clear from the above that the gear pump of my invention permits an axial movement of the shaft upon which the driving gear is mounted, while at the same time undesired leakage from the gear chamber is prevented. Necessarily it will be appreciated that the quantity of oil discharged by my pump is measured by the width of the thinner gear.

I claim:

1. In a gear pump, a shaft, a gear on said shaft, and a second gear of different width than said first named gear and in mesh therewith.

2. In a gear pump, an axially movable shaft, a gear on the shaft, and a second gear of different width than said first named gear and in mesh therewith.

3. A gear pump comprising a casing, an axially movable shaft in said casing, a gear revolubly mounted in said casing adjacent said shaft, a second gear arranged on said shaft and in mesh with said first named gear at all times during the axial movement of said shaft, and bushings arranged between said shaft and said casing on each side of said second gear.

4. A gear pump comprising a casing, a shaft in said casing, a gear revolubly mounted in said casing adjacent said shaft, a second gear arranged on said shaft and in mesh with and of different width than said first named gear, and bushings arranged between said shaft and said casing on each side of said second gear.

5. A gear pump comprising a casing, a shaft in said casing, a gear revolubly mounted in said casing adjacent said shaft, a second gear arranged on said shaft and in mesh with and of different width than said first named gear, bushings arranged between said shaft and said casing on each side of said second gear, and inlet and outlet passages in said casing.

6. A gear pump comprising a cylindrical casing, a shaft in said casing, a gear forming a running fit with said casing arranged on said shaft, a bushing forming a running fit with said casing arranged on said shaft on each side of said gear, a cylindrical extension of said casing, a gear of different width than said first named gear and in mesh therewith arranged in said extension and forming a running fit therewith, and inlet and outlet passages in said casings.

7. In combination, an axially movable shaft, a flanged casing forming a journal and step bearing for said shaft, a gear on said shaft forming a running fit with said casing, a bushing forming a running fit with said casing arranged on said shaft on each side of said gear, a supporting casing for said flanged casing and forming a closed chamber about the end of said shaft, a gear of different width than said first named gear and in mesh therewith revolubly disposed in said supporting casing, and inlet and outlet passages in said casings in communication with the chambers occupied by said gears.

8. In combination, an axially movable shaft, a flanged casing forming a journal and step bearing for said shaft, a gear on said shaft forming a running fit with said casing, a bushing forming a running fit with said casing arranged on said shaft on each side of said gear, a supporting casing for said flanged casing and forming a closed chamber about the end of said shaft, a gear of different width than said first named gear and in mesh therewith revolubly disposed in said supporting casing, means for admitting lubricating fluid to the chamber occupied by said gears, and means for connecting the said gear chamber with said shaft bearing.

9. In combination, an axially movable shaft, bearings for said shaft, a casing forming one of the bearings for said shaft, a gear on said shaft forming a running fit with said casing, a bushing forming a running fit with said casing arranged on said shaft on each side of said gear, a gear of different width than said first named gear and in mesh therewith revolubly disposed in said casing, a closed housing surrounding said casing and forming an oil reservoir, a passage connecting said housing with the chamber occupied by said gears, a second passage connecting said gear chamber with said shaft bearings, and passages connecting said bearings with said housing.

10. The combination with an axially movable, rotatable shaft, of a gear formed of cylindrical sections and an intermediate toothed section arranged on said shaft for rotation therewith, a casing forming a running fit with said gear, a driven gear mounted in said casing and meshing with said toothed section at all times during the axial movement of said shaft, and inlet and outlet passages in said casing.

11. The combination with an axially movable, rotatable shaft, of a gear formed of cylindrical sections and an intermediate toothed section secured to said shaft, a casing forming a running fit with said gear, a driven gear of less width than said toothed section mounted in said casing and meshing with said toothed section, and inlet and outlet passages in said casing.

12. The combination with an axially movable, rotatable shaft, of a gear formed of cylindrical sections and an intermediate toothed section secured to said shaft, a closed end cylindrical casing forming a running fit with said sections and forming a chamber in the closed end of the casing, a driven gear of less width than said toothed section mounted in the casing and meshing with said tooth section and inlet and outlet passages in said casing communicating with the chamber occupied by said gears.

In testimony whereof, I have hereunto set my hand at San Francisco, California, this 2d day of May 1918.

WILLIAM A. DOBLE.